United States Patent [19]

Coplan

[11] Patent Number: 4,865,736
[45] Date of Patent: Sep. 12, 1989

[54] HOLLOW FIBER SEPARATORY MODULE WITH ENCASED FIBER BUNDLE

[75] Inventor: Myron Coplan, Natick, Mass.

[73] Assignee: Albany International Corp., Albany, N.Y.

[21] Appl. No.: 279,237

[22] Filed: Nov. 29, 1988

Related U.S. Application Data

[63] Continuation of Ser. No. 186,686, Apr. 21, 1988, abandoned, which is a continuation of Ser. No. 831,158, Feb. 19, 1986, abandoned, which is a continuation-in-part of Ser. No. 807,358, Dec. 10, 1985, abandoned.

[51] Int. Cl.$^4$ .............................................. B01D 13/01
[52] U.S. Cl. .......................... 210/321.79; 210/321.88; 210/323.2; 210/450; 210/456; 210/497.1; 210/500.23; 210/500.26; 210/500.42; 55/158
[58] Field of Search ........... 210/321.79, 321.8, 321.81, 210/321.87, 321.88, 321.89, 323.2, 321.90, 450, 456, 497.1, 500.23, 500.26, 500.42; 55/158; 422/48

[56] References Cited

U.S. PATENT DOCUMENTS

| | | | |
|---|---|---|---|
| 4,207,192 | 6/1980 | Coplan | 210/497.1 |
| 4,378,981 | 4/1983 | Otstot | 55/158 |
| 4,380,460 | 4/1983 | Otstot | 210/456 |
| 4,400,276 | 8/1983 | Bollinger | 210/323.2 |
| 4,414,113 | 11/1983 | Laterra | 210/323.2 |

FOREIGN PATENT DOCUMENTS

| | | | |
|---|---|---|---|
| 2267138 | 4/1974 | France | 210/321.79 |
| 2542203 | 3/1984 | France | 210/321.79 |
| 2059290 | 4/1981 | United Kingdom | 210/321.79 |

OTHER PUBLICATIONS

Abstract of Kokai No. 54-110183 (Japan) Aug. 29, 1979.
Edlon HST-2 Roll Cover the New Heat Shrinkable Release Covering Bulletin SB 89 800 Mar. 6, 1987.

*Primary Examiner*—Ernest G. Therkorn
*Attorney, Agent, or Firm*—Kane, Dalsimer, Sullivan, Kurucz, Levy, Eisele, & Richard

[57] ABSTRACT

A hollow fiber separatory module includes an annular hollow fiber bundle housed within a pressure resistant shell. The fiber bundle is encased within an impervious barrier. Pressurized fluid is fed into the channel formed between the impervious casing and passes into the fiber bundle through an opening in the impervious barrier. The fluid flows parallel to the axis of the annular fiber bundle and passes into respective permeate and raffinate outlet ports.

10 Claims, 1 Drawing Sheet

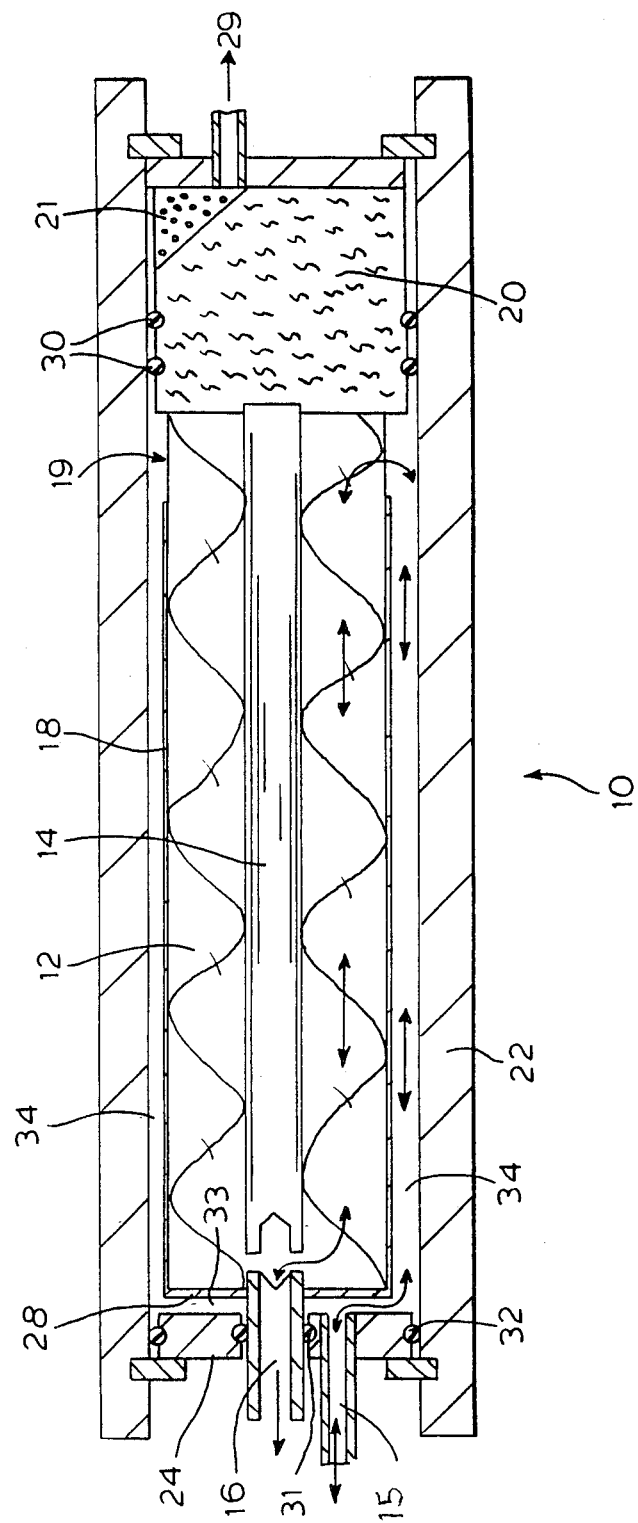

HOLLOW FIBER SEPARATORY MODULE WITH ENCASED FIBER BUNDLE

This application is a continuation of U.S. Pat. application Ser. No. 186,686, filed April 21, 1988, now abandoned, which in turn is a continuation of U.S. Pat. application Ser. No. 831,158, filed Feb. 19, 1986, now abandoned, which in turn is a continuation-in-part of U.S. Pat. application Ser. No. 807,358, filed Dec. 10, 1985, now abandoned.

FIELD OF THE INVENTION

This invention pertains to hollow fiber separatory module devices, and more particularly to a separatory module wherein an annular fiber bundle is partially encased by an impermeable sheath facilitating fluid flow parallel to the central axis of the fiber array.

BACKGROUND OF THE INVENTION

The use of membranes to effect separation of gas/gas, liquid/liquid, and liquid/solid mixtures and solutions has achieved general industrial applicability by various methods, among them being ultrafiltration, hyperfiltration, reverse osmosis, dialysis In general, membrane elements associated with these processes are contained in vessels called modules, comprising a shell having various inlet and outlet ports and an assembly of membranes within said shell. The internal configurations are so arranged as to permit the introduction of a feed stream with or without pressure on the upstream face of the membranes, means for collecting permeate which passes through the membrane and emerges on their downstream faces, and means for keeping feed and permeate materials from commingling.

Commonly assigned U.S. Pat. No. 4,207,192 discloses a hollow filament separatory module and method of fabrication generally related to the invention disclosed herein.

When hollow fiber membranes are used to separate components of a gas mixture, or solutes dissolved in liquid solutions, there are a number of methods of flowing the mixture to be separated over the membranes The flowing method employed determines the manner in which the individual hollow fiber membrane units are to be organized within the pressure shell One very common method of fiber arrangement involves arranging large numbers of parallel and straight fibers into a generally cylindrical cross-section comprising thousands or perhaps millions of such fibers arranged around an axially parallel center core tube. The core tube may be perforated or slotted and act as an inlet conduit for pressurized feed fluid. The fluid is pumped outward among the fibers at right angles to their axes and as it reaches the outer regions of the fiber array the fluid is collected in an annular space adjacent to the pressure shell inner wall surface. The same general physical arrangement of fibers might be used for flowing in the opposite direction by introducing feed in the annular space adjacent to the inner wall surface of the pressure shell and traversing radially inward toward the perforated tube lying in the center of the fiber array. As another variant to this general approach, the fiber may be wound around the center core tube in reversing helical fashion and feed introduced either into the core tube or into the perimeter of the bundle as discussed above. All of these options correspond to different forms of cross-flow feeding. That is, the flow direction or permeate in the bores of the fibers is generally at right angles to the direction of flow of the feed over their external surfaces A preferable mode of feed direction flow is co- or counter-flow, parallel to the flow of permeate in the hollow fibers. In order to achieve either of these the feed must generally flow parallel to, rather than at a right angle to, the central axis of the fiber array. The fibers may be organized either in straight assemblies parallel to the central axis of the array or, alternatively, wound in helical fashion around said central axis, as in the cross-flow situations.

However, inducing parallel flow of feed among the fibers creates opportunity for the pressurized feed gas or liquid to find bypass flow paths outside of the bundle. Such bypass route may be, for example, between the inner surface of the shell wall and the outermost fibers of the bundle. It is also possible with relatively loosely packed parallel arrays of fibers that there may be bypass channels among the fibers. One possible means to over come the latter bypass problem is to wind the fibers into relatively tight packages by helical winds of alternating S & Z directions around a central support member, thereby creating a generally annular bundle Such a bundle arrangement may then be inserted into a pressure containment shell, but a means must be found to occlude any space between the outer regions of the bundle and inner surface of the pressure shell wall to avoid the first bypass route noted above. A number of schemes have been attempted for this including such devices as lip seals, tightly embracing braids, shrink sleeves, etc. These have certain advantages but still, can frequent occasion, permit flow bypassing and have other inherent problems (See U.S. Pat. No. 4,400,276.)

SUMMARY OF THE INVENTION

The primary object of the present invention is to provide a hollow fiber separatory module utilizing axial feed fluid flow, wherein no bypass of flow occurs along the fiber bundle-pressure shell interface.

According to the present invention a typical hollow fiber bundle is wound in a typical counter helical arrangement of fibers. The bundle may be wound around a central support rod or hollow mandrel When the bundle has been wound to a desired diameter, its outer surface is encased with an impermeable barrier material over its entire length except for a circumstantial region near one end of the fiber bundle. The barrier material may be a wrap of an impervious film, or it may be an impervious coating material applied from a solvent that is innocuous to the membrane. The impervious barrier may also be in the form of a shrink sleeve installed over the bundle and shrunk onto the bundle. In any event, the impermeable barrier material will closely adhere to the external cylindrical surface of the bundle. The outermost surface of the encased bundle will then achieve a diameter which is slightly smaller than the inside diameter of the pressure containment shell.

In addition to the sheath which encompasses the majority of the cylindrical surface of the bundle, there is applied an impervious cap over the end of the bundle distal to that end which is to be potted and wherein the fiber bore openings appear. The sheath and the cap are sealed to one another in a leakproof manner so that the fiber bundle is completely sealed into a casing except for the circumferential access region noted above.

After suitable potting and other preparatory process to the bundle, the encased bundle is installed in the pressure shell with sufficient clearance between the outermost surface of the encased bundle and the inside of the shell to provide a passage for pressurized feed fluid. The term "feed fluid" as used herein refers to a feed liquid or a feed gas. The feed fluid may be admitted either at one end of the bundle or the other end, or anywhere in between, but in any event pressurized fluid is either removed from or the feed is admitted to flow among the fibers of the bundle only at the circumferential region left unwrapped or uncoated. The only other access to the fibers per se of the bundle is by means of an inlet or outlet feature of the support rod or mandrel located at the bundle end distal to the uncased region. By this means it is ensured that the feed will not bypass the fibers of the bundle and will be constrained to flow generally in a parallel direction to the orientation of the fiber axis and essentially uniformly among the fibers.

BRIEF DESCRIPTION OF THE DRAWING

The figure illustrated is a longitudinal section view of the separatory module of the present invention.

DETAILED DESCRIPTION OF THE PREFERRED EMBODIMENT

The figure illustrates a hollow fiber separatory module 10 for separating feed fluid. An annular shaped hollow fiber bundle 12 is formed by winding individual fibers in helical winds about a hollow support membrane 14 which is preferably a hollow support rod defining an exit passage, having a bundle access port 16. Said access port may serve as the connection to the pressurized feed source, or as an exit for raffinate fluid which does not permeate the walls of the hollow filament Fiber bundle 12 is encased by an impermeable barrier 18 which may be a wrap of an impervious film (for example poly-vinylidene or the like) or it may be an impervious coating material applied from an innocuous solvent (for example, polysiloxane). Alternately, the impervious barrier 18 may be a shrink sleeve installed over the bundle and shrunk onto it. In any event barrier material 18 closely adheres to the external cylindrical surface of the bundle and to end-cap 28. Barrier material 18 along with end-cap 28 encapsulates the entirety of the surface of fiber bundle 12 except for an unencapsulated circumferential surface region 19.

After impervious barrier 18 and end-cap 28 are applied to the bundle, potting material 20 is applied to the opposite end of fiber bundle 12 as shown. Potting material is a resinous sealant for terminating the fiber ends and for keeping feed and permeate materials from commingling. Fiber bore openings are created in an oblique plane of the potting material indicated at 21. Permeates exit from the system at 29.

The encased and potted fiber bundle is then encapsulated by a pressure resistant cylindrical shell 22. Shell 22 is designed to withstand internal fluid pressures generated by inlet of pressurized fluid feed into the separatory module. At one end shell 22 has two ports, 15 and 16.

The double headed arrows signify alternative possible flow directions such that if port 16 is the inlet for pressurized feed, 15 is the outlet for raffinate, and vice versa. In the former situation the feed gas on the upstream side of the fiber surface flows generally parallel to and in the same direction as the flow permeate gas in the fiber bores, normally in a co-flow mode. In the latter alternative, namely, where feed is admitted at 15, the flow path through the bundle is generally parallel but in the direction opposite to flow permeate in the fiber bores.

"O" rings 30 provide an impermeable seal between potting material 20 and the inside surface of the pressure resistant shell. Other "O" rings 31, 32 seal between end-plate 24 and tube 14 and between end-plate 24 and the inside surface of pressure shell 22.

When pressurized fluid feed is fed into access port 15 it enters plenum area 33 and then passes into channel 34 between the inside surface of the pressure resistant shell and impermeable barrier 18. In the present invention the use of sealed channel 34 as a necessary portion of the fluid feed path overcomes the problem of prior art separator devices of fiber bypass flow occurring between the pressure resistant shell and the fiber bundle. The fluid passes from channel 34 through the circumferentially unencased region 19 into fiber bundle 12. At this point the pressurized feed travels through the fiber bundle in a direction generally parallel to the axis of annular bundle 12. Permeate material passes the membrane inside surface of walls of the hollow fibers and flows therein through potting material 20 to permeate outlet port 29. Raffinate material passes into hollow support membrane 14 and passes from module 10 through exit port 16. This flow path defines the counterflow mode. As indicated, reversing the functions of access ports 16 and 15 results in the co-flow mode.

Although a detailed description of the present invention is provided, it is to be understood that the scope of the present invention is not to be limited thereby, but is to be determined by the claims which follow.

What is claimed is:

1. A hollow fiber separatory module for separating fluid elements into permeate and raffinate, said separatory module defining first and second ends, comprising:
   an annular helically wound hollow fiber bundle defining first and second ends, said bundle being enrobed on its outer surface by a thin closely conforming barrier layer of material substantially impermeable to feed fluid, said layer extending over the entirety of said outer surface except for said first end and a non-enrobed circumferential region adjacent said first end of said bundle;
   an end-cap sealed at said second end of the bundle to the impermeable barrier;
   a pressure resistant shell encasing the hollow fiber bundle and defining a channel between the pressure resistant shell and the hollow fiber bundle, said channel originating adjacent to an inlet feed means and terminating at said non-enrobed circumferential region and defining a portion of a flow path for raffinate material;
   said inlet feed means passing through the end cap for communicating between a source of feed fluid and said bundle;
   a first exit means at said first end of the separatory module in fluid communication with the fiber bundle and an area exterior to the separatory module for permitting exit of raffinate material; and
   a second exit means at said second end of the separatory module in fluid communication with the fiber bundle and an area exterior to the separatory module for permitting exit of permeate material.

2. A hollow fiber separatory module according to claim 1 further comprising a potting composition encapsulating an end of the fiber bundle.

3. A hollow fiber separatory module according to claim 2 further comprising an "O" ring seal located between the potting composition and the pressure resistant shell.

4. A hollow fiber separatory module according to claim 1 wherein the inlet feed means is in fluid communication with the fiber bundle and the first exit means communicates with the channel.

5. A hollow fiber separatory module according to claim 1 where the impermeable barrier is a shrink sleeve shrunk into the hollow fiber bundle.

6. A hollow fiber separatory module according to claim 2 further comprising a mandrel upon which the annular hollow fiber bundle is wound.

7. A hollow fiber separatory module according to claim 6 wherein the mandrel comprises a hollow tube having one end extending through the end-cap, said one end having an opening therein for communication exterior of the module, the hollow tube also having at least one opening in a wall thereof, said opening located interiorly of the end-cap providing fluid communication with the fiber bundle.

8. A hollow fiber separatory module according to claim 1 wherein the impermeable barrier is a wrap of an impervious film.

9. A hollow fiber separatory module according to claim 9 wherein the impermeable barrier is composed of polyvihylidene.

10. A hollow fiber separatory module according to claim 8 wherein the impermeable barrier is composed of polysiloxane.

* * * * *